United States Patent [19]

Swartz et al.

[11] 3,967,384
[45] July 6, 1976

[54] START-UP CONDITIONING MEANS FOR AN AZIMUTH REFERENCE

[75] Inventors: Harold L. Swartz; Paul E. Tallman, both of Glendale, Ariz.

[73] Assignee: Sperry Rand Corporation, New York, N.Y.

[22] Filed: Aug. 19, 1974

[21] Appl. No.: 498,689

[52] U.S. Cl. ............................ 33/324; 33/317 R; 74/5.4
[51] Int. Cl.² ...................................... G01C 19/02
[58] Field of Search ................. 33/317, 324; 74/5.4

[56] References Cited
UNITED STATES PATENTS

| | | | |
|---|---|---|---|
| 2,998,727 | 9/1961 | Baker | 33/317 R |
| 3,266,325 | 8/1966 | Schaffer | 33/317 R |
| 3,276,273 | 10/1966 | Baker | 74/5.4 |
| 3,324,731 | 6/1967 | Burmeister et al. | 74/5.4 |

FOREIGN PATENTS OR APPLICATIONS

| | | | |
|---|---|---|---|
| 980,823 | 1/1953 | France | 33/317 R |
| 790,031 | 1/1958 | United Kingdom | 33/317 R |

*Primary Examiner*—William D. Martin, Jr.
*Attorney, Agent, or Firm*—Howard P. Terry; Thomas J. Scott

[57] ABSTRACT

In an azimuth reference system including a flux valve coupled to a synchro stator and a directional gyro having its outer gimbal mechanically coupled to the synchro rotor, a low power electronic slaving circuit having its input electrically coupled to the rotor of the synchro and its output coupled to a torquer for slaving the directional gyro into synchronism with the flux valve. The low power electronic circuit includes a phase compensated amplifier coupled between the synchro rotor and a demodulator for producing a bipolar slaving error signal which is coupled through a high gain amplifier to parallel connected coils in the torquer. A threshold detector circuit responsive to the speed of the gyro rotor controls a limiter feedback circuit in the high gain amplifier thereby limiting its gain when the gyro rotor has attained a predetermined speed. A null sensor circuit coupled between the output of the high gain amplifier and the threshold detector circuit senses the output magnitude of the amplifier voltage and inhibits the threshold detector circuit until the magnitude of the output voltage from the high gain amplifier is below a prescribed value thereby indicating the gyro is substantially synchronized with the flux valve.

15 Claims, 1 Drawing Figure

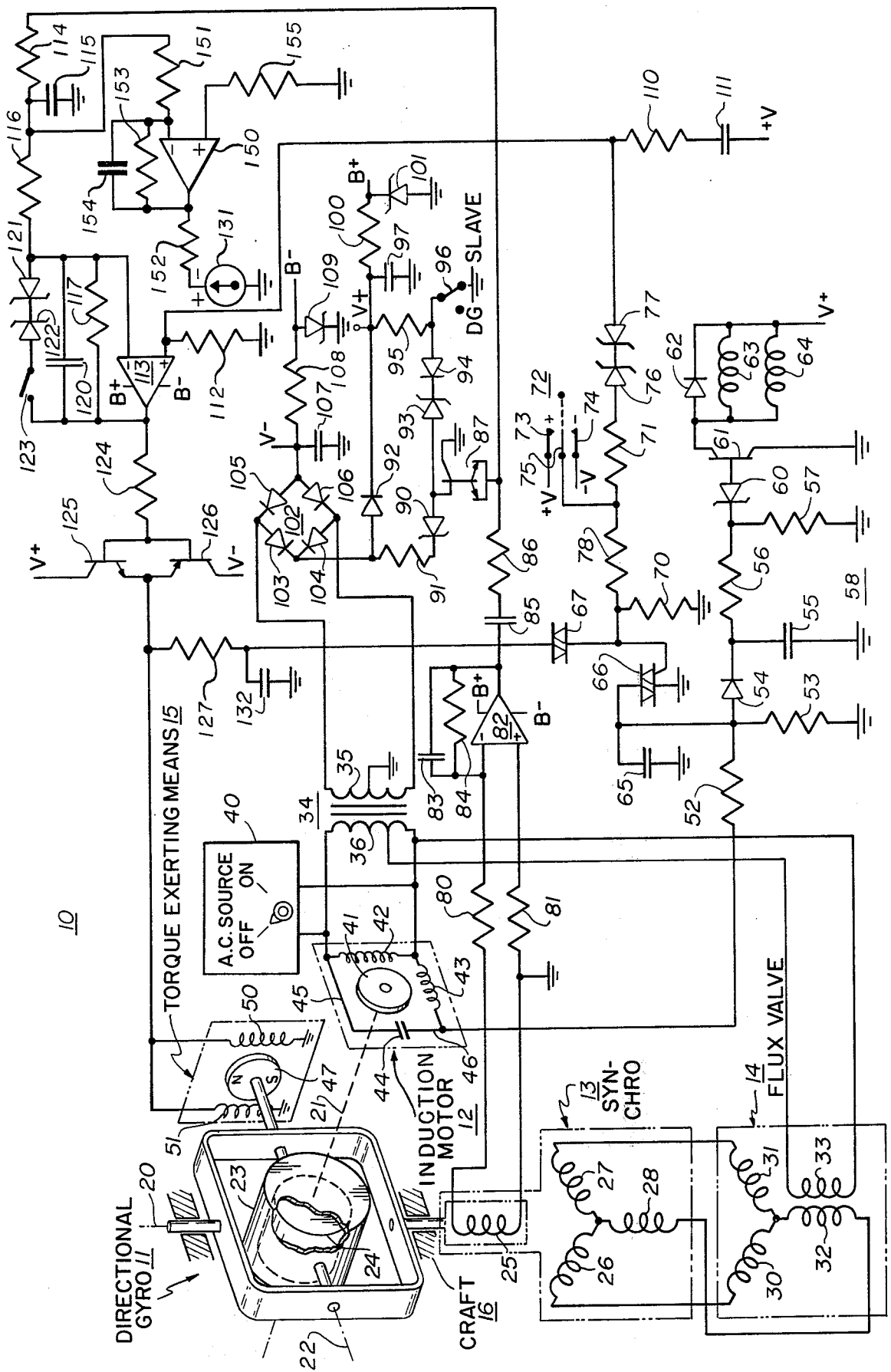

START-UP CONDITIONING MEANS FOR AN AZIMUTH REFERENCE

BACKGROUND OF THE INVENTION

1. Field of the Invention

The subject invention pertains to the control of gyroscopes and particularly to the control of a directional gyroscope employed in a gyro compass system which also includes an azimuth reference preferably a flux valve of conventional structure. Specifically the invention pertains to an improved, more reliable, more compact and less costly start-up conditioning means operable under all initial orientation conditions of the gyroscope to quickly orient the gyro with the azimuth reference while the rotor component of the gyro is spun to a predetermined speed.

2. Description of the Prior Art

The subject invention is an improvement of the apparatus disclosed in U.S. Pat. No. 3,324,731 entitled "Start-Up Conditioning Means For An Azimuth Reference", issued June 13, 1967 in the names of W. Burmeister, B. Duckworth and R. Radtke and assigned to the same assignee as the subject application. In this prior art apparatus, a synchro is coupled between a flux valve and a directional gyro. The synchro rotor produces an electrical output signal; the sense and magnitude of which depends upon the sense and magnitude of the angular displacement between the directional gyro and the flux valve, i.e., the signal is proportional to the synchronization error between the gyro and the flux valve.

Synchronization of the directional gyro to the flux valve is accomplished by a torque exerting means which exerts a greater than normal torque about the horizontal axis of the gyro to precess the vertical ring about the vertical axis in such a direction that the gyro is synchronized to the flux valve under start-up conditions and maintains synchronization at a normal torquing energy level at a time subsequent to the start-up operation.

Initially, when the prior art apparatus is energized and the gyro rotor is being brought up to normal speed, if the synchronization error signal produced in the winding of the rotor is of one sense, a first relay is energized which couples high level electrical energy from source into a first set of windings that produce rotation in the torque exerting means in a direction to reduce the error signal. Alternatively, if the synchronization error signal is of an opposite sense, it is coupled to a second relay which is energized and couples the high level energy into a second set of windings on the torque exerting means that will produce rotation in an opposite direction to that produced by energizing the first set of windings.

The high level energy is applied to the torque exerting means until the vertical ring of the gyro is precessed a sufficient amount about its axis to bring the directional gyro into synchronization with the flux valve. At this instant the first and second relays are de-energized thereby closing a circuit between the source and a threshold detector. When the speed of the gyro rotor reaches a predetermined level below its normal operating speed, the threshold detector senses the speed of the rotor and completes a circuit from the source through contacts of the first and second relays to the coil of a third relay. Upon energization of the third relay by the output of the threshold detector, the synchronization error signal is coupled through corresponding contacts on the three relays to the corresponding set of coils in the torque exerting means. As a result, any further synchronization error produces an output electrical signal at a normal energy level which is coupled through the contacts of the three relays to the corresponding set of coils on the torque exerting means. Thus the gyro is precessed at a normal energy level during normal operations.

The three relays of the prior art device are large contactor type relays having high power ratings as required to switch the high level energy to the respective set of torquing coils. Therefore, these relays occupy a substantial volume which requires mounting in a separate container outside the gyro casing. Also, the high power requirements reduce reliability due to temperature rise. It will be readily appreciated that for aircraft applications the large relays are very undesirable because of their questionable reliability, added weight, excessive volume and high cost. Also, such large relays are subject to acceleration forces which in aircraft applications may cause intermittent and undesirable closure or opening thereof during aircraft maneuvers and/or vibrations. The invention disclosed in the subject application employs discrete electronic components and sub-miniature relays which provide a significant reduction in volume, weight and overall system cost because this combination of components can be easily packaged within the gyro casing or housing thereby eliminating a separate electronics housing.

Additionally, in the prior systems it is possible for the gyros rotor and gimbal to have previously come to rest with the flux valve synchro on the gyro oriented at an ambiguous null, i.e., 180° from the normal null position. Therefore, at turn-on, the prior art apparatus may not cause this misalignment and may synchronize the gyro to the flux valve at a displacement of 180°. The invention described herein provides a means operable at turn-on which assures that the system will not synchronize at a false null.

SUMMARY OF THE INVENTION

The subject invention comprises a low power electronic slaving circuit employed to synchronize a gyroscopic apparatus such as a directional gyroscope to an azimuth reference such as a conventional flux valve. As described herein the vertical ring of the gyroscope is coupled through a shaft to the rotor of a synchro and the wye-connected windings of the synchro are connected to the sensing windings of a flux valve. The rotor of the synchro produces an output signal proportional to the slaving error between the gyroscope and the flux valve. The slaving error has a phase in accordance with the direction of the displacement error and an amplitude proportional to the magnitude of the displacement error. The low power electronic slaving circuit includes an amplifier having calculated phase shift coupled to the rotor of the synchro for amplifying the slaving error signal which is then demodulated by a unique demodulator providing a double frequency reference, to accommodate the double frequency characteristic of the flux valve signal, and coupled into a high gain amplifier. The slaving error output signal produced by the high gain amplifier is coupled through a pair of driver transistors into parallel connected coils in the torquer.

A motor, which may be a suitable induction motor, has its rotor coupled to the gyro rotor and also has its stator windings coupled to a threshold detector circuit in the low power electronic slaving circuit. As the motor is brought up to speed thereby increasing the speed of the rotor in the gyroscope, the voltage in the stator coupled into the threshold detector is also increased until the input voltage applied to the threshold detector exceeds a predetermined value thereby gating on a transistor and energizing relays in the collector circuit of the transistor. As a result of energizing one of the relays, the contacts in a limiter feedback circuit of the high gain amplifier are closed and the slaving error output signal from the high gain amplifier coupled to the parallel connected torquer coils is thereafter limited in magnitude.

However, a null detector circuit comprised of a diac and a triac coupled between the output of the driver transistors and the input of the threshold detector senses the magnitude of the slaving error driver voltage applied to the torquer coils. If the magnitude of this voltage is above a prescribed value the diac will sense this condition and maintain the triac in its conduction state thereby inhibiting the threshold detector circuit from energizing the relays in the transistor collector circuit and effectively latching high speed synchronization until synchronization is complete. Thus the improved electronic slaving circuit applies a high energy level signal to the torquer coils until the gyroscope is substantially synchronized with the flux valve as indicated by the gyro rotor attaining a predetermined speed and the driving voltage being reduced below a prescribed amplitude.

BRIEF DESCRIPTION OF THE DRAWING

The sole FIGURE is a schematic diagram of an improved start-up conditioning means for an azimuth reference system including a low power electronic slaving circuit incorporating the principles of the invention.

DESCRIPTION OF THE PREFERRED EMBODIMENT

An azimuth reference system 10 shown in the sole FIGURE includes a directional gyro 11, an induction motor 12, a synchro 13 which may be referred to as the flux valve synchro, and a torque exerting means 15 all conventionally gimballed in a craft 16. A conventional flux valve 14 is the magnetic reference for the system. The directional gyro 11 has a vertical ring mounted in the craft for rotation about a vertical axis 20 and an inner gimbal or rotor housing 23 mounted for rotation about a normally horizontal axis 22 and conventionally maintained horizontal by leveling means not shown. The rotor housing 23 encloses a rotor 24 with freedom to spin about an axis 21.

The synchro 13 includes a single phase winding 25 mounted on the synchro rotor and coupled to the vertical ring of the gyro 11 for rotation about the normally vertical axis 20. The stator of synchro 13 includes wye-connected windings 26, 27 and 28 which are connected respectively to corresponding wye-connected windings 30, 31 and 32 in the flux valve 14 which also includes an exciter winding 33. A transformer 34 has a secondary winding 35 which is center tapped to ground and a primary winding 36 which includes a partial winding coupled to the exciter winding 33. An a.c. source 40 has its output terminals coupled across the parallel combination of the primary winding 36 and a first winding 42 in the two phase stator of the motor 12. The rotor 41 thereof is rotatable about the normally horizontal axis 21 and is coupled to the rotor 24 of the gyro 11. The motor/rotor structure is, of course, illustrated schematically, it being understood that the motor 12 is actually within the gyro rotor case 23. A second winding 43 in the stator of the motor 12 has one terminal coupled to a junction of the coil 42 and the primary 36. The second terminal on the coil 43 is connected through a lead 46 to a first terminal on a conventional phasing capacitor 44 which has its second terminal connected to the second terminal on the coil 42 through a lead 45.

The torque exerting means 15 includes a magnetized rotor 47 mounted for rotation about the normally horizontal axis 22 and coupled to the rotor housing 23 of the gyro 11. A first set of coils in the torque exerting means 15 is represented by the coil 50 and has one terminal connected to a second set of coils represented by the coil 51. The other ends of the coils 50 and 51 are connected to ground thus completing a parallel connection of the sets of coils represented by the coils 50 and 51.

The lead 46 of motor 12 is connected to a first terminal on a resistor 52 which is an input resistor to a threshold detector circuit 58 in the low power electronic slaving circuit. The second terminal of the resistor 52 is connected to a first terminal on a resistor 53 and the anode of a diode 54. The cathode of the diode 54 is connected to the first terminals on a capacitor 55 and a resistor 56. The second terminal of the resistor 56 is connected to the first terminal on a resistor 57 and the cathode of a Zener diode 60. The anode of the Zener diode 60 is connected to the base terminal of a transistor 61 which has its emitter terminal connected to ground along with the second terminals of the resistor 53, the capacitor 55 and the resistor 57.

The collector terminal of the transistor 61 is connected to the anode of a diode 62 and the first terminals on parallel connected coils 63 and 64, the former controlling a switch to be described below, and the latter controlling an indicator flag or interlock functions. A source of d.c. voltage V+ is connected to the cathode of the diode 62 and the second terminals of the coils 63 and 64.

The anode of the diode 54 is also connected to a first terminal on a capacitor 65 and the anode 2 terminal of a triac 66. The second terminal of the capacitor 65 and the anode 1 terminal of the triac 66 are connected to ground. The gate terminal of the triac 66 is connected to the anode 1 terminal of a diac 67 and the first terminals on resistors 70 and 78. The second terminal on the resistor 70 is connected to ground and the second terminal on the resistor 78 is connected to a first terminal on a resistor 71 and the movable contact 75 of a pilot operated switch 72. A source of positive potential V+ is connected to a first fixed terminal 73 on the switch 72 and a source of negative potential V− is connected to a second fixed terminal 74 on the switch 72. The second terminal on the resistor 71 is connected to the anode of a Zener diode 76 which has its cathode connected to the cathode of a Zener diode 77. The anode of the Zener diode 77 is connected to a first terminal on a resistor 110 which is series coupled through a capacitor 111 to a source of positive potential V+. The anode of the Zener diode 77 is also connected to the positive (+) input terminal of the high gain amplifier 113 and the first terminal of a bias resistor 112 which has its second terminal connected to ground.

The rotor 25 of the synchro 13 has its first terminal connected through an input resistor 80 to the negative (−) input terminal on a phase compensated amplifier 82 and its second terminal connected to the junction of ground and a second input resistor 81 coupled to the positive (+) input terminal of the amplifier 82. The phase compensation of the amplifier 82 is provided by the parallel combination of a capacitor 83 and a resistor 84 coupled between the output terminal and the negative input terminal of the amplifier 82 in feedback fashion. The output terminal of the amplifier 82 is connected through the series combination of a capacitor 85 and a resistor 86 to the junction of the double emitter output terminals of a transistor 87. The collector terminal of the transistor 87 is connected to ground and the base terminal is connected to the anode terminals on Zener diodes 90 and 93. The cathode of the Zener diode 90 is coupled through a resistor 91 to the anode of a diode 92 and an output terminal of a bridge network 102 at the junction of the cathodes of diodes 103 and 104. The cathode terminal of diode 92 is connected through a resistor 95 to the anode of a diode 94 which has its cathode connected to the cathode of the Zener diode 93. The junction of the resistor 95 and the anode of the diode 94 is connected to the movable contact of a manually operated switch 96 which has a first position designated directional gyro, DG, which is a normally open position and its second position designated slave which is connected to ground.

The junction of the cathode terminal on the diode 92 and the resistor 95 is connected to the junction of a capacitor 97 and a resistor 100. The second terminal on the capacitor 97 is connected to ground and the second terminal on the resistor 100 is connected to the cathode of a Zener diode 101 which has its anode connected to ground. The junction of the capacitor 97 and resistor 100 provides a first source of positive potential V+ which in one embodiment was 24 volts and the junction of the second terminal of the resistor 100 and the cathode of the Zener diode 101 provides a second source of positive potential B+ which in this same embodiment of the invention was nominally +20 volts.

The full wave diode bridge rectifier 102 includes the four diodes, 103, 104, 105 and 106, in which the anode of the diode 103 is connected to the cathode of the diode 105, the anode of the diode 104 is connected to the cathode of the diode 106 and the anodes of the diodes 105 and 106 are connected in a common junction. The input to the bridge 102 is across the common junctions 103, 105 and 104, 106 which are connected to the first and second terminals respectively of the center tapped secondary winding 35 on the transformer 34. The output terminals of the bridge 102 is taken across the common junctions 103, 104 and 105, 106, the latter being connected to the first terminal on a capacitor 107 and the first terminal on a resistor 108. The second terminal on the resistor 108 is connected to the anode of a Zener diode 109 which has its cathode connected to ground along with the second terminal of the capacitor 107. A first source of negative potential V− which in one embodiment had a value of −24 volts is produced at the junction of the capacitor 107 and the resistor 108. A second source of negative potential B− which in this same embodiment had a value of −20 volts is produced at the junction of the second terminal on the resistor 108 and the anode of the Zener diode 109.

The combination of the Zener diode 90, resistor 91, and the fullwave bridge 102 produces a fullwave rectified output voltage having a 50% duty cycle (effectively to provide a double frequency of the supply voltage from transformer 34) which is coupled into the base terminal of the double emitter transistor 87 to demodulate the output voltage produced by the phased compensated amplifier 82.

The demodulated slaving error signal produced at the junction of the second terminal of the resistor 86 and the common junction of the emitters on the transistor 87 is coupled through a filter circuit comprised of series connected resistors 114, 116 and by pass capacitor 115 coupled between the common junction of the resistors 114, 116 and ground into the negative (−) input terminal of the high gain amplifier 113. A parallel feedback circuit coupled between the output terminal of the amplifier 113 and the negative input terminal comprise the parallel combination of resistor 117 and capacitor 120. A gain limiter feedback circuit in parallel with the resistor 117, capacitor 120 combination includes a pair of Zener diodes 121 and 122 in which the anode of diode 121 is connected to the negative input terminal of amplifier 113. The cathode of diode 121 is connected to the cathode of diode 122 which has its anode connected to the movable normally open contact 123 and the stationary contact is connected to the output of the amplifier 113.

The output signal produced by the high gain amplifier 113 is coupled through a resistor 124 and applied to the base terminals of driver transistors 125 and 126 which are pnp and npn types respectively. The collector of transistor 125 is connected to the source of positive potential V+ and the collector of transistor 126 is connected to the source of negative potential V−. The emitters of transistors 125 and 126 are connected together and to resistor 127. The second terminal on the resistor 127 is coupled into anode No. 2 of diac 67 and to the first terminal on a by pass capacitor 132 which has its second terminal connected to ground. The junction of the resistor 127 and the emitters of transistors 125, 126 is connected to the junction of the set of parallel connected coils 50 and 51 in the torque exerting means 15.

A slaving annunciator 131 is responsive to the slaving error signal and indicates that the gyro is being properly slaved to the flux valve and also the direction in which the gyro should be slaved by operation of fast slave switch 72. An amplifier 150 has its inverting input connected to the junction of capacitor 115 and resistor 116 through coupling resistor 151, the output of the amplifier 150 being connected to the annunciator 131 through resistor 152. Parallel connected resistor 153 and condenser 154 are connected in feedback around amplifier 150 to provide damping of the annunciator during any swinging of the normally pendulously mounted flux valve 14.

The combination of the full wave bridge rectifier 102, the capacitor 97, the resistor 100 and the Zener diode 101 provides sources of positive potential V+ and B+ at the junctions of the capacitor 97, resistor 100 and cathode of the diode 101 respectively which are used as the positive potentials for the transistors 61 and 125, the manual switch 72, the capacitor 111 and the amplifiers 82 and 113 respectively. The combination of the full wave bridge 102, capacitor 107, resistor 108 and diode 109 provide sources of negative potential V− and B− which are used for the collector of the transistor 126, the manual switch 72 and the amplifiers 82, 113 respectively. Thus the secondary winding 35 of the transformer 34, being center tapped to ground and combined with the full wave bridge 102, the capacitor 97, the resistor 100, the diode 101 and the capacitor 107, the resistor 108 and the diode 109 provide sources of positive and negative potentials using a minimum number of electronic components.

In operation a.c. power is simultaneously applied to the primary winding 36 of the transformer 34 and the stator coil 42 of the induction motor 12 by placing the ON-OFF switch on the a.c. source 40 in the ON position. Instantaneously an excitation voltage is applied to the exciter winding 33 of the flux valve 14 and positive and negative d.c. potentials V+, B+ and V−, B− are produced and applied to the respective terminals indicated above. The rotor 41 of the motor 12 begins slowly to rotate in response to the alternating voltage applied to the two phase stator windings and ultimately brings the rotor 24 of the gyro 11 up to normal operating speed. As the speed of the rotor 41 increases, the potential on the lead 46 increases, and contemporaneously therewith an output signal is developed across the coil mounted on the rotor 25 of the synchro 13. This signal is indicative of the slaving error having phase in accordance with the direction of displacement between the gyro 11 and the flux valve 14 and an amplitude proportional to the magnitude of the displacement therebetween. The slaving error signal is applied to the input terminals of the phase compensated amplifier 82 in accordance with the sense of displacement between the gyro 11 and the flux valve 14. In order to synchronize the modulation voltage produced at the transistor 87 with the output signal from the amplifier 82, the phase shift between the excitation voltage applied to the exciter coil 33 and the output voltage produced across the coil on the rotor 25 is calculated. Compensation is provided in the feedback circuit of the amplifier 82 comprised of the parallel combination of the capacitor 83 and resistor 84.

As is well known to those skilled in this art, the flux valve output on its legs 30, 31, 32 and repeated on the flux valve synchro legs is at double the excitation frequency; that is if the excitation frequency of source 10 is, say, 400 cycles, the output of flux valve synchro rotor 25 will be 800 cycles. Thus in order to produce a demodulated slaving error of the proper sense and magnitude, an effective 800 cycle reference signal is required. The full wave rectified 400 cycle voltage produced at the common junction of the cathodes of the diodes 103 and 104 is applied to the base of the transistor 87 through resistor 91 and Zener diode 90. The switching level of Zener diode 90 is selected to turn on and off at an amplitude point of the full wave rectified voltage waveform such as to provide an 800 cycle signal with a 50% duty cycle and thus produce an 800 cycle reference voltage entirely adequate for the purposes of this system. This 800 cycle signal coupled into the base of the transistor 87 demodulates the slaving error output signal applied to the common junction of the emitters of the transistors 87. The combination of the resistor 114 and capacitor 115 filters the demodulated signal, the resulting d.c. slaving signal being coupled through the resistor 116 into the negative input terminal of the high gain amplifier 113.

If it is desired to operate the azimuth reference system in the D.G. (directional gyro) mode, slaving is cut out by throwing switch 96 as indicated. This removes the ground for resistor 95 thereby causing transistor 87 to remain on thus disabling the slaving signal. Diode 94 and Zener 93 protect against any system V+ or B+ noise or other discontinuities.

The demodulated, filtered slaving error signal coupled to the negative input terminal of the high gain amplifier 113 is amplified and applied to the bases of the torquer driving transistors 125 and 126 for producing a slave error driver voltage which may vary from a positive value of B+ to a negative value of B−. This driver voltage is applied to the common junction of the parallel connected coils 50 and 51 in the torquer 15. Since the coils 50 and 51 are connected in parallel and the driver voltage may be either positive or negative, the direction of rotation of the rotor 47 is controlled by the polarity of the driver voltage applied to the coils 50 and 51. Thus slaving error driver voltage of a positive polarity will produce a torque on the rotor case 23 in one direction and slaving error driver voltage of a negative polarity will produce a torque in the opposite direction, to precess the gyro in a direction and to an amount to reduce the slaving error to zero.

It will be appreciated that the full range or output of the high gain amplifier 113 is available while the contacts of switch 123, controlled by relay coil 63, in the limiter feedback circuit are in the open position. When the voltage developed on the lead 46 of the induction motor 12 exceeds the threshold value of the detector 58, the transistor 61 which is normally in the gated off position, will be gated on and the relay coils 63 and 64 in the collector circuit will be energized. Other contacts of the coils 63 or 64 may be used for various other functions such as autopilot interlock and instrument flag monitoring which will indicate that the motor 12 and gyro 11 are up to normal operating speed. Additionally, the normally open (unenergized) contacts 123 in the limiter feedback circuit of the high gain amplifier 113 will be closed thereby limiting the magnitude of the slaving error signal coupled to the driver transistors 125 and 126 from the amplifier 113. This is a normally low value signal adapted to produce a low torque on the gyro so as to produce normal slow slaving on the order of a few degrees a minute.

However, if the amplitude of the slave error driver voltages coupled to the torque exerting means 15 is above a calculated value determined by the combination of components including resistor 127, diac 67 and resistor 70 which comprise a null detector circuit, then the triac 66 will be gated on and the input signal coupled through the resistor 52 from the lead 46 will be shorted to ground thereby inhibiting the threshold detector 58 from being activated. Since the start up slaving error signal will usually produce a large initial value of slaving error drive signal due to the fact that the gyro is initially forced off level, as described below, the diac 67 will initially be in its gated on condition. In one embodiment this value was approximately ± 18 volts d.c., at the output of the torquer driven transistors 125, 126.

The diac 67 has a bistable characteristic which enables it to be gated on by either a large positive or negative potential while the transfer characteristic of the triac 66 is compatible therewith in that it can be triggered into conduction by a gate signal from the diac 67 which is either a positive or negative potential. Since the transfer characteristic of the diac is such that it will remain in conduction until the voltage across it is less than 1 volt, the diac 67 will remain in conduction until the slaving error driver voltage applied to the common junction of the coils 50 and 51 is nominally a null thereby indicating a gyro 11 is substantially completely synchronized to the flux valve 14.

When the diac 67 is gated off the voltage coupled to the gate terminal of the triac 66 is removed thus unshorting the input of the threshold detector circuit 58. Since the gyro rotor 24 will have probably attained normal operating speed the voltage level on the lead 46 will exceed the threshold voltage of the detector 58 and the transistor 61 will be gated on thus energizing the relay coils 63 and 64 which, in turn, will close the normally open contacts 123 of the limiter feedback circuit in the high gain amplifier 113.

The foregoing arrangement provides a means for positively latching the system in the fast synchronization mode, until synchronization is complete and the rotor has attained operating speed. For example, during system start-up, if for some reason prior to the rotor attaining operating speed, the slaving error signal drops to a low value, i.e., passing through zero during a gyro nutation, fast slaving will remain "ON" since the speed signal from the rotor speed sensor is insufficient to trip relay switch 123. Conversely, if for some reason the rotor has come up to speed but the system is not yet synchronized diac 67 and triac 66 will inhibit the speed signal so that it cannot trip relay switch 123. Furthermore, the foregoing arrangement of diac 67 and triac 66 provides a means for latching the system in the normal slow slave mode since, once the switch 123 is closed, the maximum output of the torquer drive transistors is not sufficient to fire the diac.

In order to insure that the slaving error signal during the initial start up condition of the azimuth reference system will produce a large amplitude slave error driver voltage and to avoid the possibility of the gyro rotor being initially at a false null, i.e., displaced 180° from the null position, means are provided for initially disturbing the gyro mechanically. For this purpose, an initial pulse input to the positive input terminal of the high gain amplifier 113 is produced at the junction of the resistor 110 and the anode of the diode 77. This pulse is produced at system turn on by the positive potential V+ produced at the input of the capacitor 111 in response to the application of the a.c. potential from the source 40 to the primary winding 36 of the transformer 34.

Thus, upon system turn-on, the initial high rise rate of the positive potential V+ at the junction of the capacitor 97 and resistor 100 in response to the d.c. output of bridge 102 is detected by the capacitor 111 and produces a large current pulse which is coupled through the current limiting resistor 110 into the positive input terminal of the high gain amplifier 113. Since the rotor 24 of the gyro 11 has not yet started to rotate or is just barely moving, the output voltage from the high gain amplifier 113 coupled into the coils 50 and 51 bodily rotates the rotor case 23 which momentarily dumps the gyro rotor 24 off level. Thus, as the rotor begins to rotate the rotor case will tend to nutate, thereby assuring that the synchro rotor 25 will be positively driven away from a possible null or nearly null position which may also have been a "false" null position. As a result, a large slave error signal is assured and is coupled through the low power electronic circuitry as described above to synchronize the gyro 11 with the flux valve 14 at the proper null.

The annunciator 131 provides a visual indication to an operator of the magnitude and polarity of the slave error drive signal applied to the torque exerting means and also advises him as to direction should he desire to manually slave. Thus if the operator wishes to intervene and manually override the automatic system, he may do so through switch 72. This switch provides a fixed input signal into the high gain amplifier 113. By positioning the movable arm 75 of the manual switch 72 to either the positive or negative position will couple a positive or negative potential into the positive input terminal of the high gain amplifier 113. Simultaneously the switch will also provide a current through resistor 78 to turn on triac 66 which in turn causes transistor 61 to turn off thereby opening contacts 123 and causing amplifier 113 to operate in the fast slave mode. The gyro 11 will drive in the direction according to the manual positioning of the switch 72 by the operator. However, should the operator err in positioning the switch 72, upon release thereof, the low power electronic circuits will automatically take over and slave the gyro 11 into synchronization with the flux valve 14 as described above.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a gyromagnetic compass system including a directional gyroscope normally slaved to magnetic meridian data as detected by a flux valve, a synchro coupled between the gyroscope and the flux valve for producing a slaving error signal, a drive motor for the rotor of the gyroscope including means for providing a signal in accordance with the speed thereof, a torque motor coupled to the gyroscope for controlling the azimuthal position of the gyroscope, and an improved electronic circuit responsive to the slaving error signal and the rotor speed signal for controlling the torque motor to synchronize the gyroscope with the flux valve data, said improved electronic circuit comprising amplifier means coupled between the synchro and the torquer for providing a slaving error drive signal to the torquer in accordance with the slaving error signal for valves of gyro rotor speed below a prescribed value, speed detector means coupled between the motor and said amplifier means, said detector means being responsive to the rotor speed signal for limiting the gain of said amplifier means for values of rotor speed above a prescribed value, and null detector means coupled between said amplifier means and said speed detector means, and responsive to said slave error drive signal for inhibiting said speed detector means from limiting the gain of said amplifier means until said slave error drive signal is below a prescribed value thereby indicating that the gyro is substantially synchronized with the flux valve.

2. In a gyromagnetic compass system, an improved electronic circuit as recited in claim 1 in which said amplifier means includes a phase compensated amplifier wherein phase compensation is provided by a resistance-reactance feedback circuit having component values determined by the calculated phase shift produced by said synchro and said flux valve.

3. In a gyromagnetic compass system, an improved electronic circuit as recited in claim 2 in which said amplifier means further includes a high gain amplifier with a normally open feedback limiter circuit.

4. In a gyromagnetic compass system, an improved electronic circuit as recited in claim 3 in which said high gain amplifier includes means coupled to said speed detector means for closing said normally open feedback limiter circuit for values of gyro rotor speed above said prescribed value.

5. In a gyromagnetic compass system, an improved electronic circuit as recited in claim 1 in which said amplifier means includes means for providing a bipolar drive signal to said torquer motor and said torquer motor includes sets of parallel connected windings.

6. In a gyromagnetic compass system, an improved electronic circuit as recited in claim 1 in which said speed detector means includes threshold detector means coupled to switch means for energizing said switch means in response to said rotor speed signal proportional to values of gyro rotor speed above a prescribed value, and limiter means coupled to said switch means and said amplifier means for limiting the gain of said amplifier means in response to said energized switch means.

7. In a gyromagnetic compass system, an improved electronic circuit as recited in claim 1 in which said null detector means includes a diac coupled to said amplifier means for sensing the amplitude of said slave error drive signal and providing an output signal in accordance therewith.

8. In a gyromagnetic compass system, an improved electronic circuit as recited in claim 7 in which said null detector means further includes a triac coupled to said speed detector means and responsive to said diac output signal for inhibiting said speed detector means in response to diac output signals having an amplitude greater than the gate control voltage of said triac.

9. In a gyromagnetic compass system, an improved electronic circuit as recited in claim 8 further including manually operable synchronizing means, and means responsive thereto for further controlling said triac for inhibiting said speed detector means during said manual synchronization.

10. In a gyromagnetic compass system, an improved electronic circuit as recited in claim 1 in which said electronic circuit further comprises a current pulse generating circuit coupled to said amplifier means for producing a slaving error drive signal at the output of said amplifier means in response to the initial application of power to said azimuth reference system.

11. In a gyromagnetic compass system of the type wherein a directional gyroscope operable from a source of a.c. voltage of a predetermined frequency provides short term compass data and is normally slaved to a flux valve which provides long term compass data relative to magnetic north, said gyro and flux valve data being electrically compared by means of a synchro device to provide an a.c. slaving error signal, said flux valve being of the type which is excited from said a.c. source and the flux valve output signal to said synchro device has a frequency which is inherently double said predetermined frequency whereby said a.c. slaving error signal is at said double frequency, an apparatus for providing a double frequency reference signal for use with said a.c. slaving error signal comprising a full wave rectifying means responsive to said source of a.c. voltage and said predetermined frequency for providing a full wave rectified voltage, and unidirectional conductance means responsive to a predetermined amplitude of said full wave rectified voltage for providing an output voltage having double said predetermined frequency at a fifty percent duty cycle.

12. In a gyromagnetic compass system, an apparatus for providing a double frequency reference signal as recited in claim 11 wherein said unidirectional conductance means includes a Zener diode.

13. In a gyromagnetic compass system including a directional gyroscope normally slaved to magnetic meridian data as detected by a flux valve, a synchro coupled between said gyroscope and said flux valve for producing a slaving error signal, a drive motor for the rotor of said gyroscope and including means for providing a signal in accordance with the speed thereof, a torque motor coupled with said gyroscope for controlling the azimuthal position of said gyroscope, and an electronic circuit responsive to said slaving error signal and said rotor speed signal for controlling said torque motor whereby to synchronize said improved electronic gyroscope with said flux valve data, said circuit comprising start-up conditioning means responsive to said slaving error signal for rapidly synchronizing said gyroscope to said flux valve data through said torque motor means including switch means for supplying energizing electrical power to said conditioning means, and means responsive to the operation of said switch means for supplying a momentary, large signal to said torque motor means to initially position said gyroscope away from whatever position it had last assumed and thereby assure the generation of a large value of slaving error signal.

14. In a gyromagnetic compass system, an improved electronic circuit as recited in claim 13 wherein said rotor gyroscope is supported in a rotor housing for spinning about a normally horizontal axis and wherein said torque motor means initially bodily rotates said rotor housing away from its normal position in response to said momentary signal.

15. In a gyromagnetic compass system, an improved electronic circuit as recited in claim 14 wherein said electrical power includes a source of direct current and wherein said means for supplying said momentary large signal includes a capacitor means connected in series between said direct current source and said torque motor means.

* * * * *